US012808008B2

(12) United States Patent
Omura et al.

(10) Patent No.: US 12,808,008 B2
(45) Date of Patent: Nov. 24, 2026

(54) GRAIN-ORIENTED ELECTRICAL STEEL SHEET AND PRODUCTION METHOD THEREFOR

(71) Applicant: JFE STEEL CORPORATION, Tokyo (JP)

(72) Inventors: Takeshi Omura, Tokyo (JP); Yoshihisa Ichihara, Tokyo (JP); Kunihiro Senda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 517 days.

(21) Appl. No.: 18/253,922

(22) PCT Filed: Sep. 29, 2021

(86) PCT No.: PCT/JP2021/035983
§ 371 (c)(1),
(2) Date: May 23, 2023

(87) PCT Pub. No.: WO2022/113517
PCT Pub. Date: Jun. 2, 2022

(65) Prior Publication Data

US 2024/0011111 A1 Jan. 11, 2024

(30) Foreign Application Priority Data

Nov. 27, 2020 (JP) ................................ 2020-197435

(51) Int. Cl.
*C22C 38/02* (2006.01)
*C21D 8/1216* (2026.01)
(Continued)

(52) U.S. Cl.
CPC ......... *C21D 8/1222* (2013.01); *C21D 8/1233* (2013.01); *C21D 8/1255* (2013.01);
(Continued)

(58) Field of Classification Search
CPC .................. C22C 38/004; C22C 38/02; H01F 1/14783; H01F 1/16; H01F 1/18; H01F 1/14775;
(Continued)

(56) References Cited

U.S. PATENT DOCUMENTS 4,293,350 A 10/1981 Ichiyama et al.
2013/0098507 A1 4/2013 Omura et al.
(Continued)

FOREIGN PATENT DOCUMENTS

CN 103025903 A 4/2013
CN 105220071 A 1/2016
(Continued)

OTHER PUBLICATIONS

Sep. 11, 2024, Office Action issued by the Canadian Intellectual Property Office in the corresponding Canadian Patent Application No. 3,197,565.
(Continued)

*Primary Examiner* — Vanessa T. Luk
(74) *Attorney, Agent, or Firm* — KENJA IP LAW PC

(57) ABSTRACT

Provided is a grain-oriented electrical steel sheet comprising a magnetic flux density B8 of 1.92 T or more, wherein a ratio Wa/Wb of a film thickness Wa of a forsterite film on a strain-introduced surface to a film thickness Wb of a forsterite film on a non-strain-introduced surface is 0.5 or more, an average width of a magnetic domain discontinuous portion on the non-strain-introduced surface is 1.00 time or more of an average width of a magnetic domain discontinuous portion on the strain-introduced surface, the average width of the magnetic domain discontinuous portion on the non-strain-introduced surface is 400 μm or less, and compressive stress exists in a rolling direction in a range from a surface of the steel sheet that is the strain-introduced surface to at least 2 μm in a sheet thickness direction.

2 Claims, 2 Drawing Sheets

(51) Int. Cl.

| | |
|---|---|
| ***C21D 8/1244*** | (2026.01) |
| ***C21D 8/1277*** | (2026.01) |
| ***C21D 10/00*** | (2006.01) |
| ***C22C 38/04*** | (2006.01) |
| ***H01F 1/147*** | (2006.01) |
| ***H01F 1/18*** | (2006.01) |

(52) U.S. Cl.

CPC ......... *C21D 8/1283* (2013.01); *C21D 8/1288* (2013.01); *C21D 10/005* (2013.01); *C22C 38/02* (2013.01); *C22C 38/04* (2013.01); *H01F 1/14783* (2013.01); *H01F 1/18* (2013.01); *C21D 8/125* (2013.01); *C21D 2201/05* (2013.01)

(58) Field of Classification Search

CPC ...... C21D 10/005; C21D 8/12; C21D 8/1277; C21D 8/1288; C21D 8/1294; C21D 8/1283

See application file for complete search history.

(56) References Cited

U.S. PATENT DOCUMENTS

| | | | | |
|---|---|---|---|---|
| 2013/0130043 | A1 | 5/2013 | Omura et al. | |
| 2013/0133783 | A1 | 5/2013 | Yamaguchi et al. | |
| 2014/0338792 | A1 | 11/2014 | Takajo et al. | |
| 2015/0187474 | A1* | 7/2015 | Takajo | H01F 1/16 148/112 |
| 2017/0182591 | A1 | 6/2017 | Arai et al. | |
| 2020/0010917 | A1 | 1/2020 | Terashima et al. | |

FOREIGN PATENT DOCUMENTS

| | | | | |
|---|---|---|---|---|
| CN | 106460111 | A | 2/2017 | |
| EP | 2602340 | A1 | 6/2013 | |
| EP | 3584330 | A1 | 12/2019 | |
| JP | S572252 | B2 | 1/1982 | |
| JP | 2012031498 | A | 2/2012 | |
| JP | 2012036442 | A | 2/2012 | |
| JP | 2012052230 | A | 3/2012 | |
| JP | 2012172215 | A | 9/2012 | |
| JP | 2013139590 | A | 7/2013 | |
| JP | 6200908 | B2 | 9/2017 | |
| JP | 2018131680 | A | 8/2018 | |
| KR | 20090116516 | A * | 11/2009 | C21D 10/00 |
| KR | 1020110063187 | A | 6/2011 | |
| KR | 1020130037216 | A | 4/2013 | |

OTHER PUBLICATIONS

Mar. 13, 2025, Office Action issued by the China National Intellectual Property Administration in the corresponding Chinese Patent Application No. 202180078771.0 with English language search report.

Sep. 29, 2023, the Extended European Search Report issued by the European Patent Office in the corresponding European Patent Application No. 21897495.4.

Dec. 4, 2024, Office Action issued by the China National Intellectual Property Administration in the corresponding Chinese Patent Application No. 202180078771.0 with English language search report.

Chinese Mechanical Engineering Society; Special Processing Branch of Chinese Mechanical Engineering Society, Roadmap for Special Processing Technology, Nov. 2016, pp. 190-194, China Science and Technology Press with a partial English Translation.

May 13, 2025, Office Action issued by the China National Intellectual Property Administration in the corresponding Chinese Patent Application No. 202180078771.0 with English language Concise Statement of Relevance.

Dec. 7, 2021, International Search Report issued in the International Patent Application No. PCT/JP2021/035983.

Feb. 4, 2025, Office Action issued by the Korean Intellectual Property Office in the corresponding Korean Patent Application No. 10-2023-7021132 with English language concise statement of relevance.

* cited by examiner

GRAIN-ORIENTED ELECTRICAL STEEL SHEET AND PRODUCTION METHOD THEREFOR

TECHNICAL FIELD

The present disclosure relates to a grain-oriented electrical steel sheet suitable as an iron core material of a transformer and the like, and a production method therefor.

BACKGROUND

Grain-oriented electrical steel sheets are mainly used as iron cores of transformers, and are required to have excellent magnetization properties, in particular low iron loss.

It is therefore important to highly align secondary recrystallized grains in the steel sheet with (110)[001] orientation (i.e. Goss orientation) and reduce impurities in the product steel sheet. However, operations such as control of crystal orientation and reduction of impurities have limitations due to factors such as production costs. In view of this, various magnetic domain refining techniques, i.e. techniques of introducing non-uniformity to the steel sheet surface by a physical method and refining the magnetic domain width to reduce iron loss, are developed.

For example, JP S57-2252 B2 (PTL 1) proposes a technique of irradiating a steel sheet after final annealing with a laser to introduce a high dislocation density region into the surface layer of the steel sheet and narrow the magnetic domain width to reduce the iron loss of the steel sheet.

JP 2012-52230 A (PTL 2) proposes a technique of controlling the magnetic domain discontinuous portions on the irradiation surface and the non-irradiation surface by irradiation with an electron beam.

CITATION LIST

Patent Literature

PTL 1: JP S57-2252 B2
PTL 2: JP 2012-52230 A

SUMMARY

Technical Problem

The technique described in PTL 1 can achieve iron loss reduction, but is insufficient in reducing noise. The technique is thus problematic in terms of achieving both iron loss reduction and noise reduction.

The technique described in PTL 2 can be used to obtain a grain-oriented electrical steel sheet with low noise and low iron loss. In recent years, however, there is a demand for further reduction in iron loss.

Moreover, in the case of applying the technique described in PTL 2 to laser irradiation, an extremely large amount of energy needs to be input into the steel sheet in order to form a magnetic domain discontinuous portion on the back side because the penetrability is lower than that of an electron beam. In this case, although the same level of magnetic domain refining effect as electron beam irradiation can be achieved, the total iron loss is below the level of the electron beam irradiated material due to degradation of hysteresis loss.

The technique described in PTL 2 also has a problem in that the magnetostrictive property degrades, causing an increase in noise. In addition, input of high energy severely damages the forsterite film, making it very difficult to suitably control its film thickness.

It could therefore be helpful to provide a grain-oriented electrical steel sheet that is subjected to magnetic domain refining treatment by laser irradiation and achieves low noise and low iron loss when assembled into an actual transformer, together with an advantageous production method therefor.

Solution to Problem

Upon careful examination, we discovered that, by effectively using shock waves in addition to thermal diffusion which is a conventional magnetic domain refining mechanism, it is possible to form a stress distribution necessary for achieving the effect of improving the iron loss property and the noise property while preventing damage to the forsterite film.

The present disclosure is based on these discoveries.

We Thus Provide:

1. A grain-oriented electrical steel sheet comprising: forsterite films on both sides of the steel sheet; a strain-introduced surface on one of the sides of the steel sheet; and a magnetic flux density $B_8$ of 1.92 T or more, wherein a ratio Wa/Wb of a film thickness Wa of a forsterite film on the strain-introduced surface to a film thickness Wb of a forsterite film on a non-strain-introduced surface is 0.5 or more, an average width of a magnetic domain discontinuous portion on the non-strain-introduced surface is 1.00 time or more of an average width of a magnetic domain discontinuous portion on the strain-introduced surface, the average width of the magnetic domain discontinuous portion on the non-strain-introduced surface is 400 μm or less, and compressive stress exists in a rolling direction in a range from a surface of the steel sheet that is the strain-introduced surface to at least 2 μm in a sheet thickness direction.

2. A production method for a grain-oriented electrical steel sheet, the production method comprising: subjecting a slab for a grain-oriented electrical steel sheet to hot rolling, and to cold rolling once or twice or more with intermediate annealing therebetween to obtain a steel sheet with a final sheet thickness; thereafter subjecting the steel sheet to decarburization annealing; thereafter applying an annealing separator composed mainly of MgO to a surface of the steel sheet; thereafter subjecting the steel sheet to final annealing and further to tension coating treatment also serving as flattening annealing; and thereafter subjecting the steel sheet to magnetic domain refining treatment by laser beam irradiation, wherein the laser beam irradiation is performed under the following conditions (1) and (2): (1) a picosecond laser or a femtosecond laser is used, and (2) laser power is 100 W or more, and the tension coating treatment is performed under the following condition (3): (3) tension applied to the steel sheet during the flattening annealing is controlled to 5 MPa to 15 MPa.

Advantageous Effect

It is thus possible to obtain a grain-oriented electrical steel sheet that can maintain the effects of iron loss reduction and magnetostriction improvement by magnetic domain refining in an actual transformer. Hence, an actual transformer with low noise can be obtained while maintaining low iron loss.

DETAILED DESCRIPTION

The presently disclosed technique will be described in detail below.

In the present disclosure, all of the following four points (requirements) are satisfied in order to suppress increases in noise and iron loss in an actual transformer that uses a grain-oriented electrical steel sheet subjected to magnetic domain refining treatment and having strain applied thereto.

[Control of Thickness of Forsterite Film on Strain-Introduced Surface]

The first point is the control of the thickness of the forsterite film on the strain-introduced surface. The control of the thickness of the forsterite film is important for the following reason.

The forsterite film on the surface of the steel sheet applies tension to the steel sheet. Variation in the thickness of the forsterite film causes non-uniform tension distribution in the steel sheet. If the tension distribution is non-uniform, distortion of the magnetostrictive vibration waveform of the steel sheet, which causes noise, occurs, as a result of which harmonic components are superimposed and an increase in noise ensues. To suppress such an increase in noise, it is important to suppress a decrease in the thickness of the forsterite film on the strain introduction-side surface (referred to as "strain-introduced surface" in the present disclosure) caused when introducing small strain.

Figure 1:
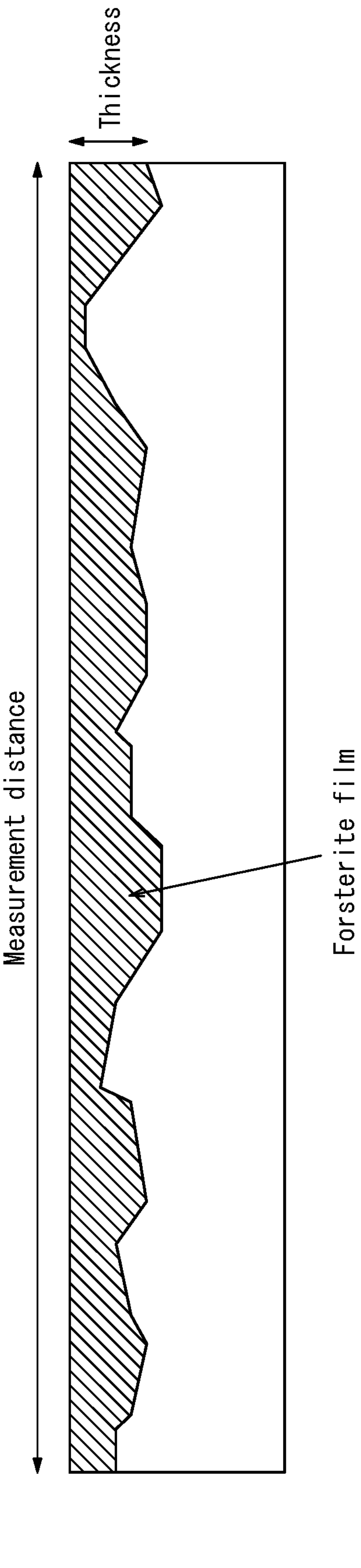
FIG. 1 is a schematic diagram illustrating a cross section for measuring the thickness of a forsterite film.

In view of the above, in the present disclosure, the ratio (Wa/Wb) of the film thickness Wa of the forsterite film on the strain-introduced surface to the film thickness Wb of the forsterite film on the non-strain introduction side surface (referred to as "non-strain-introduced surface" in the present disclosure) needs to be 0.5 or more. The ratio (Wa/Wb) is preferably 0.7 or more. The upper limit of the ratio (Wa/Wb) is theoretically 1.0, but is industrially about 0.95. Wa and Wb are each an average forsterite film thickness. Such an average forsterite film thickness can be derived by observing, with a SEM, a forsterite film in a cross section in the rolling direction as illustrated in FIG. 1, measuring the thickness of the forsterite film at 20 locations beginning with any location with a pitch of 3 mm, and averaging the values measured at the 20 locations.

To satisfy the foregoing ratio (Wa/Wb), it is important to suppress a decrease in the thickness of the forsterite film in the part to which small strain is applied, as mentioned above. The suppression means will be described below.

First, it is important to form a good forsterite film. In the present disclosure, the term "good forsterite film" refers to a forsterite film having high denseness with few voids caused by cracks and the like. The most influential factor that causes damage such as cracks to the forsterite film is the the tension applied to the steel sheet during tension coating treatment which also serves as flattening annealing. If the tension is high, the forsterite film is damaged and develops cracks or the like. In the case where cracks or the like occur in the forsterite film, the film is likely to wear when strain is introduced by laser irradiation. It is therefore necessary to control the tension applied to the steel sheet to 15 MPa (1.5 kgf/mm$^2$) or less in the flattening annealing furnace where the steel sheet temperature is high and the tension sensitivity is high.

Moreover, in the production method according to the present disclosure, the tension needs to be 5 MPa (0.5 kgf/mm$^2$) or more. If the tension is less than 5 MPa, the shape adjustment of the steel sheet is insufficient.

We also found out that an effective way of suppressing damage to the forsterite film is to use shock waves instead of thermal diffusion which is a conventional magnetic domain refining mechanism. The reason for this is not clear, but is considered to be because of the difference in energy introduction mechanism between thermal diffusion and shock waves. To generate a shock wave, it is necessary to generate plasma on the steel sheet surface. Accordingly, it is very important to control the power and pulse width of the laser beam.

In the case where a picosecond or femtosecond laser is used, inputting high energy, i.e. laser power of 100 W or more, to the steel sheet generates plasma, and as a result a shock wave propagates inside the steel sheet. In the case where a nanosecond or microsecond laser is used, on the other hand, the degree of energy concentration is insufficient, and accordingly simply irradiating the steel sheet with the foregoing laser power does not generate plasma.

The strain introduction mechanism by electron beam irradiation used in PTL 2, etc. is also a method employing conventionally used thermal diffusion, and is not a method using shock waves.

[Control of Stress Distribution in Rolling Direction in Surface Layer of Steel Sheet]

The second point important in the present disclosure is the control of the stress distribution in the surface layer of the steel sheet using a shock wave. In the case where energy is input to the steel sheet using a shock wave, the stress distribution in the surface layer of the steel sheet is different from that in the case where conventional thermal diffusion is used. As disclosed in JP 2005-248291 A, in the case where thermal diffusion is used, tensile stress is introduced in the rolling direction in the surface layer of the steel sheet. In the case where a shock wave is used, on the other hand, compressive stress is introduced in the rolling direction in the surface layer of the steel sheet.

In the present disclosure, as a result of magnetic domain refining using a shock wave by laser beam irradiation under predetermined conditions, the stress distribution in the rolling direction in the surface layer of the steel sheet (i.e. the range from the steel sheet surface to 2 μm in depth in the sheet thickness direction, not including the below-described forsterite film) is controlled so that compressive stress will exist. If the depth in the sheet thickness direction in which compressive stress exists is less than 2 μm, it means that the shock wave applied to the steel sheet is insufficient, so that such energy that can achieve the desired iron loss reduction effect cannot be introduced to the inside of the steel sheet. If the depth in which compressive stress exists is 2 μm or more, which is sufficiently large, it means that the shock wave applied to the steel sheet is sufficiently large, so that energy sufficient to achieve the iron loss reduction effect can be introduced to the inside of the steel sheet. Moreover, the use of a shock wave can prevent damage to the film and also achieve the noise reduction effect, despite a large amount of energy being introduced into the steel sheet. The depth of 2 μm in which compressive stress exists is an index that indicates the minimum required magnitude of the shock wave for achieving the iron loss reduction effect and the noise reduction effect. As well as this depth, the absolute value of the stress is also an index that indicates the magnitude of the shock wave. In the present disclosure, the absolute value of the stress itself is not limited, and the effects can be achieved as long as compressive stress of more than 0 MPa exists at least in the range of 2 μm in the sheet thickness direction. To further enhance the effects according to the present disclosure, the maximum compressive stress in the range of 2 μm in the sheet thickness direction is preferably 10 MPa or more, and more preferably 20 MPa or more. Further preferably, compressive stress exists throughout the range from the steel sheet surface to 10 μm in depth in the sheet thickness direction. In the present disclosure, such compressive stress may exist in one or more locations within the surface layer of the steel sheet.

The stress in the rolling direction in the surface layer of the steel sheet can be measured by using a single crystal X-ray stress analysis method as described in JP 2005-248291 A.

In electron beam irradiation used in PTL 2, etc., thermal diffusion is used as mentioned above, and thus such control that causes compressive stress to exist in the rolling direction in the surface layer of the steel sheet cannot be performed.

[Control of Magnetic Domain Discontinuous Portion on Strain-Introduced Surface and Non-Strain-Introduced Surface of Steel Sheet]

Figure 2:
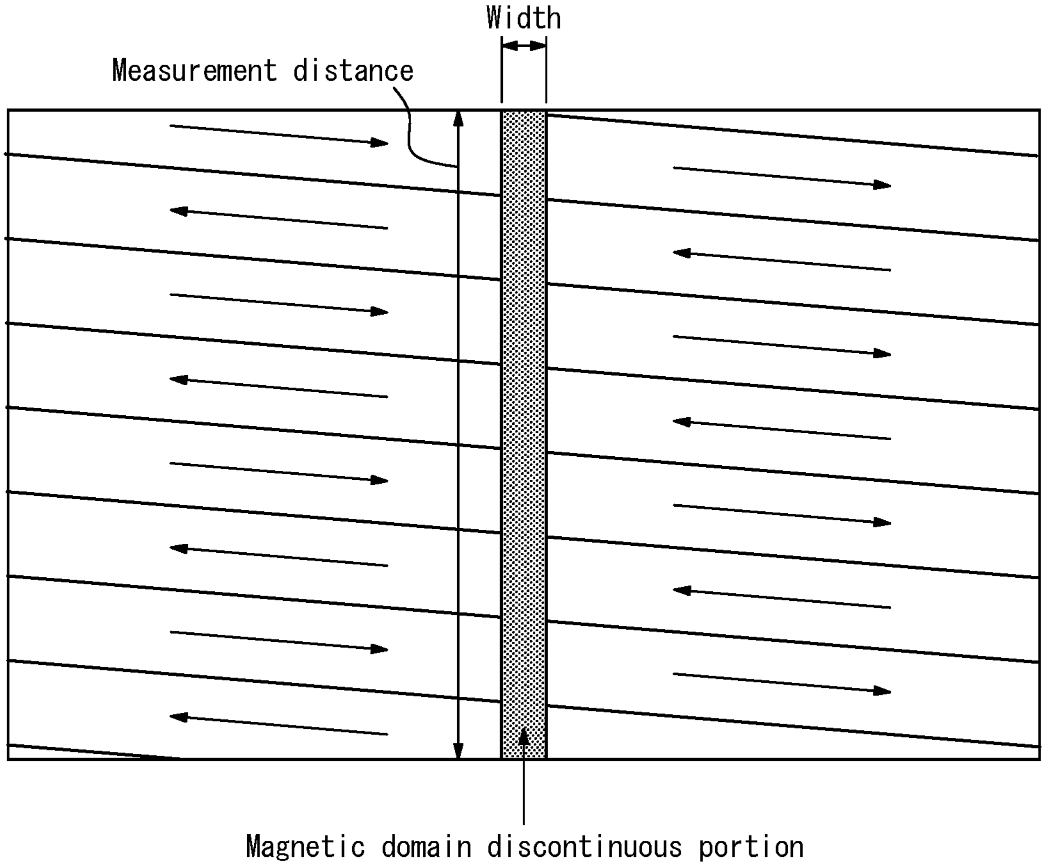
FIG. 2 is a schematic diagram illustrating the magnetic domain observation results of a steel sheet.

The third point in the present disclosure is the control of a magnetic domain discontinuous portion linearly formed on each of the strain-introduced surface and the non-strain-introduced surface as illustrated in FIG. 2. Although an increase in noise can be suppressed to some extent by the foregoing control of the thickness of the forsterite film, an actual transformer is required to have lower noise and lower iron loss.

To reduce the iron loss of the transformer, it is important to reduce the iron loss of the grain-oriented electrical steel sheet as the material of the transformer. To sufficiently achieve the magnetic domain refining effect in the material, it is important to:

i) introduce strain to the inside of the steel sheet until a magnetic domain discontinuous portion forms on the non-strain-introduced surface, too; and
ii) reduce the input energy as much as possible because strain introduction causes degradation in hysteresis loss property.

Specific conditions for satisfying these i) and ii) are that the average width of the magnetic domain discontinuous portion on the non-strain-introduced surface is 1.00 time or more of the average width of the magnetic domain discontinuous portion on the strain-introduced surface ((the average width of the magnetic domain discontinuous portion on the non-strain-introduced surface)/(the average width of the magnetic domain discontinuous portion on the strain-introduced surface)) (also referred to as the "ratio in magnetic domain discontinuous portion width" in the present disclosure) and the width of the magnetic domain discontinuous portion on the non-strain-introduced surface is 400 μm or less, with as little input energy as possible using a shock wave. No upper limit is placed on the ratio in magnetic domain discontinuous portion width, but the upper limit is preferably about 3 times. No lower limit is placed on the width of the magnetic domain discontinuous portion on the non-strain-introduced surface. However, if the width is 100 μm or less, which is excessively narrow, the effects are insufficient, and accordingly the lower limit is preferably about 100 μm. It is also preferable not to excessively increase the energy input when introducing strain, as mentioned above. Since the width of the magnetic domain discontinuous portion on the back side (non-strain-introduced surface) is proportional to the input energy, it is preferable to control the width to be narrow to a certain extent. The width is preferably less than 250 μm. The average width of the magnetic domain discontinuous portion on the non-strain-introduced surface is more preferably in the range of 100 μm or more and less than 250 μm.

In the present disclosure, the average width of the magnetic domain discontinuous portion on the non-strain-introduced surface is defined to satisfy the above i), and the upper limit of the average width on the non-strain-introduced surface is set to satisfy the above ii).

In the case where the maximum tension applied to the steel sheet during flattening annealing, which is the foregoing first point, is exceeded or in the case where laser beam irradiation is performed under conditions of not using a shock wave, it is extremely difficult and industrially impractical to satisfy the foregoing heat-affected width (the average width of the magnetic domain discontinuous portion) without decreasing the thickness of the forsterite film.

What is important in the present disclosure is to define the average width of the magnetic domain discontinuous portion, and is not to define the average irradiation width. This is because, when a shock wave is introduced into a steel sheet, the shock wave spreads in all directions such as the sheet thickness direction and the sheet transverse direction, and the magnetic domain discontinuous portion affected by this usually tends to be wider than the irradiation width.

The average width of the magnetic domain discontinuous portion can be determined by observing the magnetic domains from the steel sheet surface by the Bitter method using a magnetic colloid that tends to be attracted to parts with large changes in magnetization and measuring the discontinuity width identified in the beam irradiation portion. More specifically, the magnetic domain discontinuous portion is measured over a length of 100 mm, and the area of the magnetic domain discontinuous portion is determined using image analysis software. By dividing the determined area by the measurement distance, the magnetic domain width in the observation site is obtained. The magnetic domain width is derived at 20 locations by this method, and the average value thereof is taken to be the average width.

[High Integration Degree of Material Grains to Easy Axis of Magnetization]

The fourth point is that the integration degree of material grains to the easy axis of magnetization is high.

Regarding transformer noise, i.e. magnetostrictive vibration, the vibration amplitude is smaller when the integration degree of grains to the easy axis of magnetization is higher. Hence, for noise suppression, the magnetic flux density $B_8$, which is also an index of the integration degree to the easy axis of magnetization, needs to be 1.92 T or more. If the magnetic flux density $B_8$ is less than 1.92 T, the rotational motion of the magnetic domains that occurs so as to be parallel to the excitation magnetic field in the magnetization process causes large magnetostriction and increases the transformer noise. Since the magnetic domain refining effect is higher when the integration degree is higher, the magnetic flux density $B_8$ of the grain-oriented electrical steel sheet as the material needs to be 1.92 T or more from the viewpoint of achieving the iron loss reduction effect according to the present disclosure, too. Such iron loss measurement can be performed by a single-sheet magnetic property measurement test using the H coil method defined in JIS C 2566.

For the strain introduction treatment in the present disclosure, laser beam irradiation is preferably used.

Preferred irradiation condition is that a laser beam is applied linearly (dot sequence) in the irradiation direction (laser scanning direction) that is a direction intersecting the rolling direction, more preferably a direction of 60° to 90° with respect to the rolling direction, along the steel sheet surface. The laser beam irradiation interval (line interval) is preferably about 3 mm to 15 mm. Further, a pulsed laser with a picosecond or femtosecond pulse width and a power of 100 W or more is preferable because a shock wave can be generated.

The means of obtaining the steel sheet according to the present disclosure is not limited to such, and other methods may be used as long as the requirements for the grain-oriented electrical steel sheet according to the present disclosure are satisfied.

In this specification, a picosecond laser is a laser with a pulse width of 1 ps or more and less than 1000 ps, and a femtosecond laser is a laser with a pulse width of 1 fs or more and less than 1000 fs.

The production conditions for the grain-oriented electrical steel sheet according to the present disclosure will be described in detail below.

In the present disclosure, the chemical composition of a slab for the grain-oriented electrical steel sheet is any chemical composition that causes secondary recrystallization.

In the case of using an inhibitor, for example, appropriate amounts of Al and N are contained if the inhibitor used is a AlN-based inhibitor, and appropriate amounts of Mn and Se and/or S are contained if the inhibitor used is a MnS/MnSe-based inhibitor. Both inhibitors may be used together. In this case, the Al content is preferably 0.01 mass % or more. The Al content is preferably 0.065 mass % or less. The Al content is more preferably 0.01 mass % to 0.065 mass %. The N content is preferably 0.005 mass % or more. The N content is preferably 0.012 mass % or less. The N content is more preferably 0.005 mass % to 0.012 mass %. The S content is preferably 0.005 mass % or more. The S content is preferably 0.03 mass % or less. The S content is more preferably 0.005 mass % to 0.03 mass %. The Se content is preferably 0.005 mass % or more. The Se content is preferably 0.03 mass % or less. The Se content is more preferably 0.005 mass % to 0.03 mass %.

The presently disclosed technique can also be used for grain-oriented electrical steel sheets not using inhibitors with limited Al, N, S, and Se contents.

In this case, the Al content is preferably 100 mass ppm or less, the N content is preferably 50 mass ppm or less, the S content is preferably 50 mass ppm or less, and the Se content is preferably 50 mass ppm or less. The preferred basic components and optional additional components of the slab for the grain-oriented electrical steel sheet according to the present disclosure other than the foregoing elements will be described in detail below.

C: 0.08 Mass % or Less

C is added to improve the hot-rolled sheet microstructure. If the C content is more than 0.08 mass %, it is difficult to reduce C to 50 mass ppm or less at which no magnetic aging is induced, during the production process. The C content is therefore preferably 0.08 mass % or less. No lower limit needs to be placed because secondary recrystallization is possible even with a material that does not contain C. The C content may be more than 0%, or % or more. The C content is typically 100 mass ppm or more.

Si: 2.0 Mass % to 8.0 Mass %

Si is an element effective in increasing the electrical resistance of the steel and improving the iron loss property. If the Si content is less than 2.0 mass %, the iron loss reduction effect is insufficient. If the Si content is more than 8.0 mass %, the workability decreases significantly, and also the magnetic flux density decreases. Accordingly, the Si content is preferably 2.0 mass % or more. The Si content is preferably 8.0 mass % or less. The Si content is more preferably in the range of 2.0 mass % to 8.0 mass %.

Mn: 0.005 Mass % to 1.0 Mass %

Mn is an element necessary for improving the hot workability. If the Mn content is less than 0.005 mass %, the effect is insufficient. If the Mn content is more than 1.0 mass %, the magnetic flux density of the product sheet decreases. Accordingly, the Mn content is preferably 0.005 mass % or more. The Mn content is preferably 1.0 mass % or less. The Mn content is more preferably in the range of 0.005 mass % to 1.0 mass %.

In the present disclosure, it is preferable to optionally contain the following elements as magnetic property improving components, besides the foregoing preferred basic components.

At least one selected from the group consisting of Ni: 0.03 mass % to 1.50 mass %, Sn: 0.01 mass % to 1.50 mass %, Sb: 0.005 mass % to 1.50 mass %, Cu: 0.03 mass % to 3.0 mass %, P: 0.03 mass % to 0.50 mass %, Mo: 0.005 mass % to 0.10 mass %, and Cr: 0.03 mass % to 1.50 mass %.

Ni is a useful element for improving the hot-rolled sheet microstructure and improving the magnetic properties. If the Ni content is less than 0.03 mass %, the magnetic property improving effect is insufficient. If the Ni content is more than 1.50 mass %, secondary recrystallization is unstable and the magnetic properties degrade. Accordingly, the Ni content is preferably mass % or more. The Ni content is preferably 1.50 mass % or less. The Ni content is more preferably in the range of 0.03 mass % to 1.50 mass %.

Sn, Sb, Cu, P, Mo, and Cr are each a useful element for improving the magnetic properties. If the content of each of these elements is less than the foregoing lower limit, the magnetic property improving effect is insufficient. If the content of each of these elements is more than the foregoing upper limit, the growth of secondary recrystallized grains is hindered. Accordingly, the content of each of these elements is preferably in the foregoing range.

The balance other than the above-described components consist of Fe and inevitable impurities mixed in the production process.

The slab having the above-described chemical composition is heated and hot rolled according to a conventional method. Alternatively, the slab may be directly hot rolled without heating, after casting. In the case of a thin slab or thinner cast steel, it may be hot rolled, or may be subjected to the subsequent processes without hot rolling. An example of a typical method will be described below.

The slab is heated to an appropriate temperature (1150 °C to 1450 °C) on the hot rolling entry side, subjected to rough rolling and finish rolling to obtain the desired thickness (1.6 mm to 2.6 mm), and coiled.

The steel sheet is further optionally subjected to hot-rolled sheet annealing. For high growth of Goss texture in the product sheet, the hot-rolled sheet annealing temperature is preferably 800 °C or more and preferably 1100 °C or less, and more preferably in the range of 800 °C to 1100 °C. If the hot-rolled sheet annealing temperature is less than 800 °C, band texture in the hot rolling remains, which may make it difficult to realize homogenized primary recrystallized texture and hinder the growth of secondary recrystallized grains. If the hot-rolled sheet annealing temperature is more than 1100 °C, the grain size after the hot-rolled sheet annealing is excessively coarse, which may make it difficult to realize homogenized primary recrystallized texture.

After the hot-rolled sheet annealing, the steel sheet is cold rolled either once, or twice or more with intermediate annealing therebetween, to the final sheet thickness. After this, the steel sheet is subjected to decarburization annealing, and an annealing separator composed mainly of MgO is applied to the steel sheet surface. After the annealing separator is applied, the steel sheet is subjected to final annealing for the purpose of secondary recrystallization and forsterite film formation. An example of a typical method will be described below.

Performing the cold rolling at a final rolling reduction ratio of 80% to 95% and a cold rolling temperature of 100 °C to 250 °C is effective in growth of Goss texture. The final sheet thickness is preferably 0.15 mm to 0.35 mm. If the steel sheet is excessively thick, the iron loss is likely to increase. If the steel sheet is excessively thin, the secondary recrystallization phenomenon is unstable and texture with good crystal orientation may be unable to be obtained.

In the decarburization annealing process, it is preferable that the annealing temperature is 700 °C to 900 °C and the soaking time is 30 sec to 180 sec. If the soaking time is less than 30 sec and if the annealing temperature is less than 700 °C, primary recrystallized grains are excessively small, and the crystal orientation of secondary grains is likely to degrade. If the annealing temperature is more than 900 °C and if the soaking time is more than 180 sec, primary recrystallized grains are excessively large, and the crystal orientation of secondary grains is likely to degrade. $P(H_2O)/P(H_2)$ in the decarburization annealing atmosphere is preferably 0.1 to 0.6. If $P(H_2O)/P(H_2)$ is less than 0.1, the residual C content is excessively high. If $P(H_2O)/P(H_2)$ is more than 0.6, the oxygen coating amount is excessively high. Consequently, the formation of a good forsterite film may be hindered. The heating rate is preferably 20 °C/sec or more and more preferably 100 °C/sec or more, from the viewpoint of the growth of Goss texture in the primary recrystallized texture.

The annealing separator may contain 50 mass % or more of MgO, and may be applied in the form of a slurry. The annealing separator preferably further contains 1 part by mass or more and 15 parts by mass or less of Ti oxide in terms of $TiO_2$ with respect to 100 parts by mass of the annealing separator, in order to improve the film appearance. The amount of MgO applied is preferably 10 g or more and 30 g or less after drying on both sides per 1 $m^2$ of the steel sheet surface. If the amount of MgO applied is less than 10 g, the annealing separation effect may be insufficient. If the amount of MgO applied is more than 30 g, the forsterite film is excessively thick, which may cause a decrease in film adhesion.

The final annealing may be performed under known conditions. For example, the steel sheet may be held at a high temperature of about 1200 °C for 3 hr or more.

After the final annealing, it is effective to perform flattening annealing for shape adjustment. Before or after the flattening annealing, an insulating coating is formed on the steel sheet surface. In the present disclosure, the insulating coating is such a coating (hereafter also referred to as "tension coating") that can apply tension to the steel sheet for iron loss reduction. Examples of the tension coating include an inorganic coating containing silica and a ceramic coating by physical vapor deposition, chemical vapor deposition, or the like.

[Controlling Tension Applied to Steel Sheet During Flattening Annealing to 5 MPa to 15 MPa]

In the present disclosure, it is important to control the tension applied to the steel sheet during the flattening annealing to 5 MPa to 15 MPa (the fifth point).

If the tension applied is excessively weak, the flattening effect cannot be achieved. If the tension applied is excessively strong, defects such as cracks are introduced into the forsterite film, as a result of which exfoliation of the forsterite film is promoted at the time of local strain introduction as magnetic domain refining treatment. This makes it difficult to control the difference in forsterite film thickness between the front and back sides to the range according to the present disclosure.

[Laser Beam Irradiation Conditions]

In the present disclosure, the surface of the steel sheet after the tension coating treatment, preferably one side of the steel sheet after the tension coating treatment, is irradiated with a laser beam to perform magnetic domain refining treatment. For the laser beam irradiation, it is important to use a picosecond laser or femtosecond laser having the foregoing pulse width and control the laser power to 100 W or more, in order to effectively use a shock wave and achieve the iron loss and noise improving effect while suppressing damage to the forsterite film (sixth point). It is also preferable to control other conditions such as the steel sheet surface state during the irradiation as described above. Thus, the effect of applying strain to the inside of the steel sheet by laser beam irradiation can be sufficiently achieved, and damage to the film can be reduced as much as possible.

In the present disclosure, a conventionally known grain-oriented electrical steel sheet production method involving magnetic domain refining treatment using a laser beam may be applied to conditions other than the foregoing process conditions, magnetic domain refining treatment conditions, and production conditions.

EXAMPLES

Steel slabs each having a chemical composition containing C: 0.08 mass %, Si: 3.4 mass %, Mn: 0.01 mass %, Ni: 0.05 mass %, Al: 260 mass ppm, N: 90 mass ppm, Se: 150 mass ppm, S: 10 mass ppm, and O: 18 mass ppm with the balance consisting of Fe and inevitable impurities were each produced by continuous casting, heated to 1420 °C, and then hot rolled to obtain a hot-rolled sheet with a sheet thickness of 2.6 mm. The hot-rolled sheet was then subjected to hot-rolled sheet annealing at 1100 °C for 120 sec. Following this, the hot-rolled sheet was cold rolled to an intermediate sheet thickness of 0.80 mm, and subjected to intermediate annealing under the conditions of oxidizability: $PH_2O/PH_2=0.32$, temperature: 1000 °C, and time: 60 sec. Further, after removing subscale from the surface by pickling with hydrochloric acid, the steel sheet was cold rolled again to obtain a cold-rolled sheet with a final sheet thickness of 0.23 mm.

The cold-rolled sheet was then subjected to decarburization annealing of holding for 60 sec under the conditions of oxidizability $PH_2O/PH_2=0.50$ and soaking temperature: 830 °C. After this, an annealing separator composed mainly of MgO was applied, and final annealing intended for secondary recrystallization, forsterite film formation, and purification was performed at 1250 °C for 100 hr. An insulation coating containing 60 mass % of colloidal silica and aluminum phosphate was then applied, and baked at 900 °C. to obtain a test steel sheet. This tension coating application process also served as flattening annealing. The tension applied to the steel sheet during the flattening annealing was 8.5 MPa.

Subsequently, one side of the steel sheet was subjected to magnetic domain refining treatment of applying a laser beam or an electron beam in a direction orthogonal to the rolling direction. The irradiation interval (line interval) in the laser beam irradiation was 5.0 mm, and the other irradiation conditions were changed as shown in Table 1. The primary recrystallization annealing temperature was changed to yield a material (steel sheet) of 1.93 T to 1.94 T in magnetic flux density $B_8$ ("material magnetic flux density" in Table 1). Each obtained steel sheet was evaluated on the ratio in film thickness between the forsterite film on the strain-introduced surface and the forsterite film on the non-strain-introduced surface ("film thickness ratio Wa/Wb" in Table 1), the stress distribution in the steel sheet surface layer ("whether compressive stress existed in whole range (surface layer) from surface to 2 μm in depth" in Table 1, where "o" indicates that compressive stress existed and "x" indicates that compressive stress did not exist), the maximum value of stress in the rolling direction in the steel sheet surface layer, whether compressive stress existed in the whole range from the surface to 10 μm in depth ("o" indicates that compressive stress existed and "x" indicates that compressive stress did not exist in Table 1), the average width of the magnetic domain discontinuous portion on each of the strain-introduced surface and the non-strain-introduced surface, the ratio in magnetic domain discontinuous portion width, and the magnetic properties (material magnetic flux density, material iron loss).

Next, after the test steel sheets were sheared into specimens having bevel edges, they were assembled into 500 kVA three-phase transformers. Iron loss and noise were measured under excitation at 50 Hz and 1.7 T. The transformer noise and the building factor are shown in Table 1. The building factor is the increase ratio of the transformer iron loss to the material iron loss ((transformer iron loss)/(material iron loss)).

The maximum value of stress in the rolling direction in the steel sheet surface layer (MPa) was determined according to the single crystal X-ray stress analysis method.

For the maximum value of stress in the rolling direction on the steel sheet surface in this example, the stress in the range from the steel sheet surface to 2 μm in the sheet thickness direction (depth: 0 μm to 2 μm, that is, the surface layer) was measured. In Table 1, "+" (plus) indicates tensile stress, and "−" (minus) indicates compressive stress.

TABLE 1

| No. | Beam type | Pulse width | Power (W) | Scanning rate (m/s) | Film thickness ratio (Wa/Wb) | Whether compressive stress existed in whole range from surface to 2 μm in depth (surface layer)? | Maximum value of stress in rolling direction in steel sheet surface layer (MPa) [+: tensile, −: compressive] | Whether compressive stress existed in whole range from surface to 10 μm in depth? | Average width of magnetic domain discontinuous portion on strain-introduced surface (μm) |
|---|---|---|---|---|---|---|---|---|---|
| 1 | Laser | 200 ns | 200 | 10 | 0.8 | x | 30 | x | 150 |
| 2 | | | 1000 | 10 | 0.3 | x | 60 | x | 150 |
| 3 | | 50 μs | 500 | 40 | 0.8 | x | 20 | x | 200 |
| 4 | | | 2500 | 40 | 0.3 | x | 50 | x | 200 |
| 5 | | 80 fs | 50 | 3 | 0.8 | x | 10 | x | 100 |
| 6 | | | 100 | 6 | 0.8 | o | −5 | x | 100 |
| 7 | | | 500 | 200 | 0.8 | o | −12 | x | 100 |
| 8 | | | 1000 | 200 | 0.8 | o | −40 | o | 100 |
| 9 | | 300 ps | 80 | 5 | 0.9 | x | 5 | x | 50 |
| 10 | | | 100 | 10 | 0.9 | o | −1 | x | 50 |
| 11 | | | 2000 | 400 | 0.9 | o | −15 | x | 50 |
| 12 | | | 2000 | 400 | 0.9 | o | −50 | o | 50 |
| 13 | Electron beam | — | 100 | 10 | 0.9 | x | 60 | x | 200 |
| 14 | | | 500 | 40 | 0.9 | x | 50 | x | 200 |
| 15 | | | 3000 | 100 | 0.9 | x | 80 | x | 100 |

| No. | Average width of magnetic domain discontinuous portion on non-strain-introduced surface (μm) | Ratio in magnetic domain discontinuous portion width | Material magnetic flux density $B_8$ (T) | Material iron loss $W_{17/50}$ (W/kg) | Noise (dBA) | Building factor | Remarks |
|---|---|---|---|---|---|---|---|
| 1 | 80 | 0.53 | 1.94 | 0.75 | 60 | 1.20 | Comparative Example |
| 2 | 250 | 1.67 | 1.94 | 0.80 | 70 | 1.10 | Comparative Example |
| 3 | 40 | 0.20 | 1.94 | 0.75 | 60 | 1.20 | Comparative Example |
| 4 | 220 | 1.10 | 1.94 | 0.70 | 70 | 1.10 | Comparative Example |
| 5 | 40 | 0.40 | 1.93 | 0.75 | 60 | 1.20 | Comparative Example |
| 6 | 100 | 1.00 | 1.93 | 0.70 | 60 | 1.07 | Example |
| 7 | 120 | 1.20 | 1.93 | 0.68 | 60 | 1.05 | Example |
| 8 | 150 | 1.50 | 1.93 | 0.66 | 60 | 1.03 | Example |
| 9 | 20 | 0.40 | 1.94 | 0.75 | 60 | 1.20 | Comparative Example |
| 10 | 50 | 1.00 | 1.94 | 0.70 | 60 | 1.06 | Example |
| 11 | 70 | 1.40 | 1.94 | 0.68 | 60 | 1.04 | Example |

TABLE 1-continued

| | | | | | | | |
|---|---|---|---|---|---|---|---|
| 12 | 150 | 3.00 | 1.94 | 0.66 | 60 | 1.02 | Example |
| 13 | 334 | 1.67 | 1.93 | 0.72 | 60 | 1.10 | Comparative Example |
| 14 | 220 | 1.10 | 1.93 | 0.72 | 60 | 1.10 | Comparative Example |
| 15 | 160 | 1.60 | 1.93 | 0.72 | 60 | 1.10 | Comparative Example |

Note:
Ratio in magnetic domain discontinuous portion width denotes (average width of magnetic domain discontinuous portion on non-strain-introduced surface)/(average width of magnetic domain discontinuous portion on strain-introduced surface).

Test Nos. 1 and 3 correspond to conditions in which laser irradiation was performed with a conventionally used pulse width to suppress transformer noise. Under such conditions, the ratio in magnetic domain discontinuous portion width was outside the range according to the present disclosure, so that improvement in material iron loss was insufficient and improvement in building factor was insufficient.

In test Nos. 2 and 4, the energy input (power) was increased to limit the ratio in magnetic domain discontinuous portion width to be within the range according to the present disclosure. However, in test Nos. 2 and 4, noise increased, and the effect according to the present disclosure was not obtained. Moreover, although the building factor was lower than that in Nos. 1 and 3, its improvement was still insufficient.

In test Nos. 5 and 9, the power was outside the range according to the present disclosure, so that no shock wave was generated and compressive stress did not occur in the steel sheet surface layer. Consequently, improvement in material iron loss and building factor was insufficient.

In test Nos. 6, 7, 8, 10, 11, and 12, all conditions were within the range according to the present disclosure, so that good results were obtained in all of material iron loss, noise, and building factor. Nos. 7 and 11 with preferable conditions within the range according to the present disclosure had better results, and Nos. 8 and 12 with more preferable conditions within the range according to the present disclosure had even better results.

In test Nos. 13, 14, and 15, electron beam irradiation was performed so that the ratio in magnetic domain discontinuous portion width would be within the range according to the present disclosure, so that certain levels of properties were exhibited in material iron loss, noise, and building factor. However, compressive stress did not occur in the steel sheet surface layer unlike test Nos. 6, 7, 8, 10, 11, and 12 in which a shock wave was used. Consequently, improvement in material iron loss and building factor was insufficient.

The invention claimed is:

1. A grain-oriented electrical steel sheet comprising:
- forsterite films on both sides of the steel sheet;
- a strain-introduced surface on one of the sides of the steel sheet; and
- a magnetic flux density $B_8$ of 1.92 T or more,
- wherein a ratio Wa/Wb of a film thickness Wa of a forsterite film on the strain-introduced surface to a film thickness Wb of a forsterite film on a non-strain-introduced surface is 0.5 or more,
- an average width of a magnetic domain discontinuous portion on the non-strain-introduced surface is 1.00 time or more of an average width of a magnetic domain discontinuous portion on the strain-introduced surface,
- the average width of the magnetic domain discontinuous portion on the non-strain-introduced surface is less than 250 μm,
- compressive stress exists in a rolling direction in a range from a surface of the steel sheet that is the strain-introduced surface to at least 2 μm in a sheet thickness direction, and
- a maximum compressive stress in the rolling direction in the range from the surface of the steel sheet to at least 2 μm in a sheet thickness direction is 10 MPa or more.

2. A production method for the grain-oriented electrical steel sheet according to claim 1, the production method comprising:
- subjecting a slab for a grain-oriented electrical steel sheet to hot rolling, and to cold rolling once or twice or more with intermediate annealing therebetween to obtain a steel sheet with a final sheet thickness;
- thereafter subjecting the steel sheet to decarburization annealing;
- thereafter applying an annealing separator composed mainly of MgO to a surface of the steel sheet;
- thereafter subjecting the steel sheet to final annealing and further to tension coating treatment also serving as flattening annealing; and
- thereafter subjecting the steel sheet to magnetic domain refining treatment by laser beam irradiation,
- wherein the laser beam irradiation is performed under the following conditions (1) and (2):
- (1) a picosecond laser or a femtosecond laser is used, and
- (2) laser power is 100 W or more, and
- the tension coating treatment is performed under the following condition (3):
- (3) tension applied to the steel sheet during the flattening annealing is controlled to 5 MPa to 15 MPa.

* * * * *